United States Patent [19]

Hurley

[11] Patent Number: 5,363,299
[45] Date of Patent: Nov. 8, 1994

[54] METHOD FOR IDENTIFYING FAULTS AND UNCONFORMITIES IN A GEOLOGIC FORMATION

[75] Inventor: Neil F. Hurley, Littleton, Colo.

[73] Assignee: Marathon Oil Company, Findlay, Ohio

[21] Appl. No.: 76,510

[22] Filed: Jun. 14, 1993

[51] Int. Cl.⁵ .............................................. G06F 15/21
[52] U.S. Cl. ................................................... 364/422
[58] Field of Search ................. 364/421, 422; 324/323, 324/366

[56] References Cited

U.S. PATENT DOCUMENTS

| | | | |
|---|---|---|---|
| 4,210,964 | 7/1980 | Rogers et al. | 364/578 |
| 4,334,271 | 6/1982 | Clavier | 364/422 |
| 4,357,660 | 11/1982 | Hepp | 364/422 |
| 4,414,656 | 11/1983 | Hepp | 364/422 |
| 4,638,254 | 1/1987 | Uhri | 324/323 |
| 4,781,062 | 11/1988 | Taylor | 364/422 |
| 5,057,021 | 10/1991 | Delhomme | 434/430 |
| 5,162,994 | 11/1992 | Torres | 364/422 |

Primary Examiner—Donald E. McElheny, Jr.

[57] ABSTRACT

A process for analyzing geological bedding plane data from a well, and plotting the cumulative dip angle and dip direction of the bedding planes with respect to depth. The cumulative dip angle may also be plotted with respect to sample numbers, which are a function of depth. The process further analyzes the cumulative dip data to produce a series of straight line approximations of various groupings of data. When these straight line approximations intercept, the interception often indicates a fault or unconformity at the location of the interception. The process further analyzes the cumulative dip plot by taking the first derivative of the plotted line. A stepwise shift in the derivative indicates an inflection point in the line, which often indicates a fault or unconformity. The process also plots the dip direction as the color or symbol of each point plotted and a color or symbol change often indicates a fault or unconformity.

19 Claims, 9 Drawing Sheets

METHOD FOR IDENTIFYING FAULTS AND UNCONFORMITIES IN A GEOLOGIC FORMATION

FIELD OF THE INVENTION

This invention relates to a method for finding geologic faults and unconformities by analyzing data from a well and more particularly to analyzing bedding plane dip data from a well to find such faults and unconformities. Even more particularly, the invention relates to analyzing cumulative dip angles and dip direction to find faults and unconformities.

BACKGROUND OF THE INVENTION

The detection of faults and unconformities is a long-standing problem in petroleum reservoir characterization studies and in the evaluation of exploration oil wells. Faults and unconformities may compartmentalize petroleum reservoirs in ways previously unsuspected. During well completion, an operator may want to avoid faults because they provide permeable conduits to channel water to the borehole. Conversely, an operator may want to preferentially test faults because associated breccias are the only permeable rocks in an otherwise tight section. Angular unconformities, even those with very subtle dip discordances, could be key sequence boundaries.

Dip angle is the angle a bedding plane makes with the earth's surface. Strike angle is the angle of a line formed when a bedding plane intercepts the earth's surface. Strike angle is measured with respect to north, which is zero degrees. Dip direction is the orientation of a line perpendicular to strike and directed down the dip of a given plane. Dip direction is also expressed as a number of degrees wherein north is zero degrees. Bedding plane orientations within a well can be measured from oriented core samples, dipmeter logs, and acoustic or electrical borehole imaging logs.

Oriented core is generally unavailable, because of the difficulties in gathering the cores. Also, because cored intervals are usually much shorter than logged intervals, potential faults and/or unconformities may exist in uncored areas. Because of this, logging methods are most useful for bedding plane detection and measurement.

Dipmeters, such as the stratigraphic high-resolution dipmeter tool (SHDT) introduced by Schlumberger in the early 1980's, provides data on bedding planes of a borehole. The dipmeter has four pads, oriented 90° apart, and each pad contains two electrodes mounted only three centimeters apart. The dipmeter emits an electrical current and measures the resistivity between the two electrodes at a high sampling rate of one sample approximately every one tenth inch. Data is measured by moving the dipmeter through the borehole and recording the electrical resistivity at each sample. Using the sample data, dip angle and direction of bedding planes can be measured within a borehole.

An improved tool for measuring dip angle and direction was introduced by Schlumberger in the mid 1980's. This tool is called a Formation Micro Scanner (FMS) and it operates in a manner similar to a dipmeter. The formation microscanner, however, contains many more electrodes and takes many more measurements which are closer together than the measurements of a dipmeter. The device has arrays of microresistivity sensors set on two, four or eight pads, to give oriented images of the borehole wall, in addition to containing four pads to produce dipmeter measurements. The tool emits a controlled and focused current into the geologic formation, and this current is returned to the tool where the proportion of the current flowing from the dense array of electrodes is recorded as a series of individual curves, representing microconductivity changes such as those due to bedding surfaces or fractures intersecting the well bore. The measurement is shallow with respect to the borehole wall, and has a very good vertical resolution. The tool contains a triaxial accelerometer and three magnetometers to give accurate orientation information and to enable speed corrections to be made to the acquired data.

Data from dipmeters is computer processed to correlate resistivity peaks, and often indicates correlation when the peaks do not actually correlate. Because of this, the tadpole plots produced from dipmeter data commonly show a lot of scatter.

Borehole imaging logs, such as those produced by the Formation Micro Scanner, are the best choice for reliable bedding plane orientations. One advantage of the borehole imaging logs, is that the bedding planes are picked by human analysis, rather than by computer algorithm, and once picked, software then calculates the dip angle and dip direction. This causes the dip angle and direction to be more reliable, and it reduces scatter.

Bedding plane orientations commonly differ above and below faults and unconformities, although this does not always occur. There is need in the art for a method using dip angle and direction to locate faults and unconformities.

SUMMARY OF THE INVENTION

It is an aspect of the present invention to detect geologic faults and unconformities using dip angle and dip direction measurements taken from a single borehole.

It is another object of the invention to plot the cumulative dip angle with respect to depth.

Still another aspect of the invention is to plot the cumulative dip angle with respect to sample number, which is a function of depth.

Yet another aspect of the invention is to plot dip direction along with cumulative dip angle by indicating dip direction as a color change or a symbol change on the cumulative dip plot.

Still another aspect of the invention is to analyze the cumulative dip plot to detect inflection points that indicate a fault or unconformity.

A further aspect of the invention is to plot the derivative of the cumulative dip data, and to analyze this derivative to detect faults and unconformities.

The above and other aspects of the invention are accomplished in a system which analyzes data from borehole imaging logs, or data acquired using dipmeters, and plots the cumulative dip angle of bedding planes measured within the formation with respect to the depth of the measurement.

The cumulative dip angle may be plotted with respect to depth, or it may be plotted with respect to sample number, wherein the sample numbers are in ascending or descending sequence, and therefore are a function of depth. Because of irregular spacing between samples, plotting using sample number versus cumulative dip often produces a smoother plot for easier analysis.

The system further analyzes the cumulative dip data, to produce a series of straight line approximations of various groupings of data. When these straight line approximations intercept, a fault or unconformity is often present at the location of the interception.

The system also plots the dip direction using a different color for each quadrant. A color change often indicates a fault or unconformity.

The system further analyzes the cumulative dip plot, by taking the first derivative of the plotted line. Since the plotted line contains an inflection point at the location of a fault or unconformity, the derivative of the plotted line will change in a stepwise manner at the inflection point, thus changes in the derivative indicate the possibility of a fault or unconformity.

BRIEF DESCRIPTION OF THE DRAWINGS

The above and other aspects, features, and advantages of the invention will be better understood by reading the following more particular description of the invention, presented in conjunction with the following drawings, wherein.

DESCRIPTION OF THE PREFERRED EMBODIMENT

The following description is of the best presently contemplated mode of carrying out the present invention. This description is not to be taken in a limiting sense but is made merely for the purpose of describing the general principles of the invention. The scope of the invention should be determined by referencing the appended claims.

Figure 1:
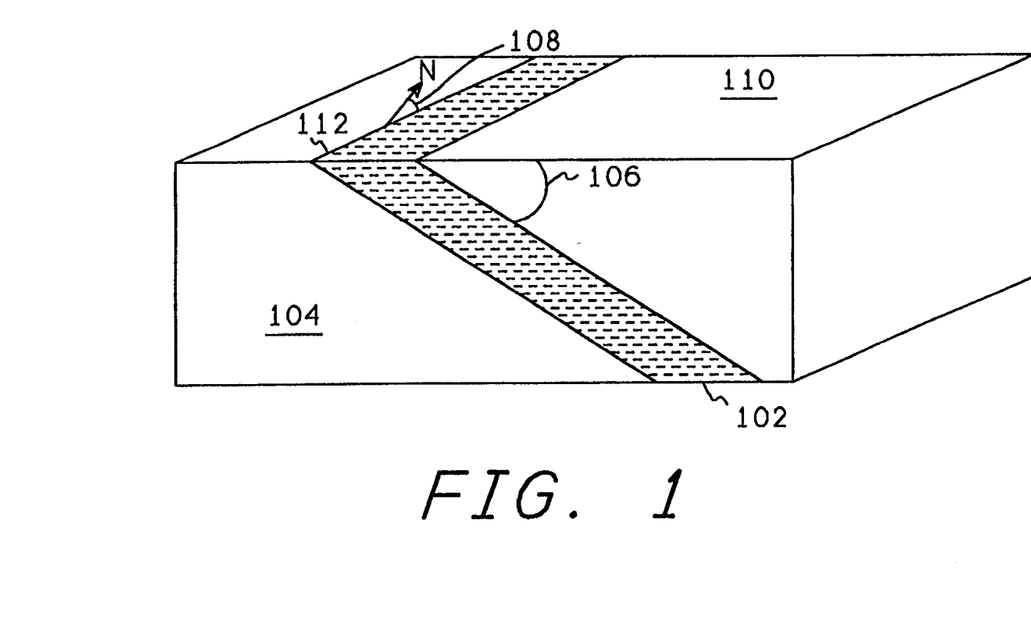
FIG. 1 shows a bedding plane intercepting the earth's surface, and illustrates dip angle and dip direction.

FIG. 1 shows a bedding plane intercepting the earth's surface, and illustrates dip angle and dip direction. Referring now to FIG. 1, a geologic formation 104 contains a bedding plane 102. The bedding plane 102 makes an angle 106 with the surface of the earth 110.

Where the bedding plane 102 strikes the surface of the earth 110, or an imaginary surface parallel to the surface of the earth, a line 112 is formed on the surface 110. The angle of the line 112 with respect to north is called the strike angle of the bedding plane, indicated here by angle 108. In this example, the angle 108 is approximately 10°. The dip direction of the bedding plane 102 is a line perpendicular to the strike angle, thus, in this example, the dip direction is approximately 100°.

Figure 2:
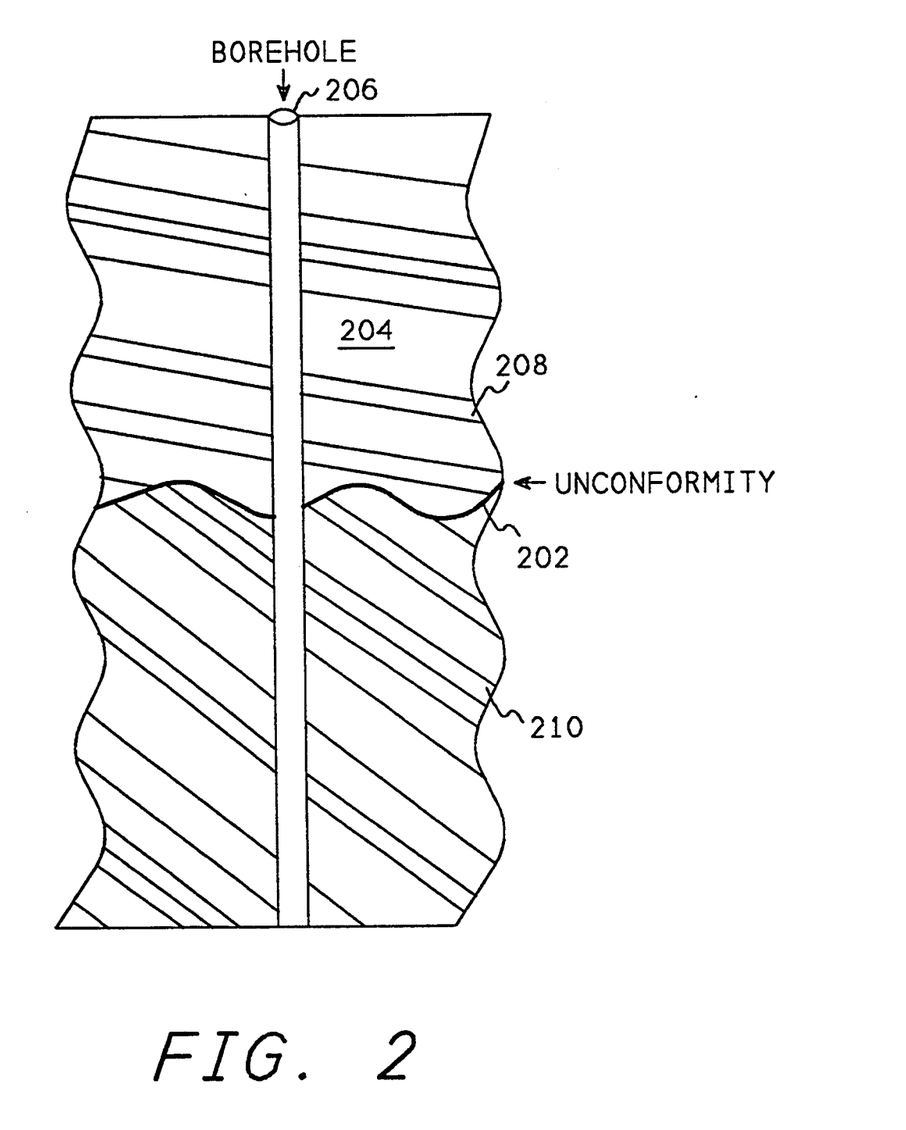
FIG. 2 shows how bedding planes differ on either side of a geologic unconformity.

FIG. 2 shows how bedding planes differ on either side of a geologic unconformity. Referring now to FIG. 2, a geologic formation 204 contains an unconformity 202. Bedding planes on one side of the unconformity are often at a different dip angle from bedding planes on the other side of an unconformity. For example, the dip angle of bedding plane 208, located above the unconformity 202, is shallower than the dip angle of bedding plane 210, located below the unconformity 202. By detecting a change in the dip angle of bedding planes within a borehole 206, the unconformity 202 can be detected.

An unconformity might also be indicated if the angle of the bedding plane stayed the same on either side of the unconformity, but the dip direction of the bedding planes changed.

Figure 3:
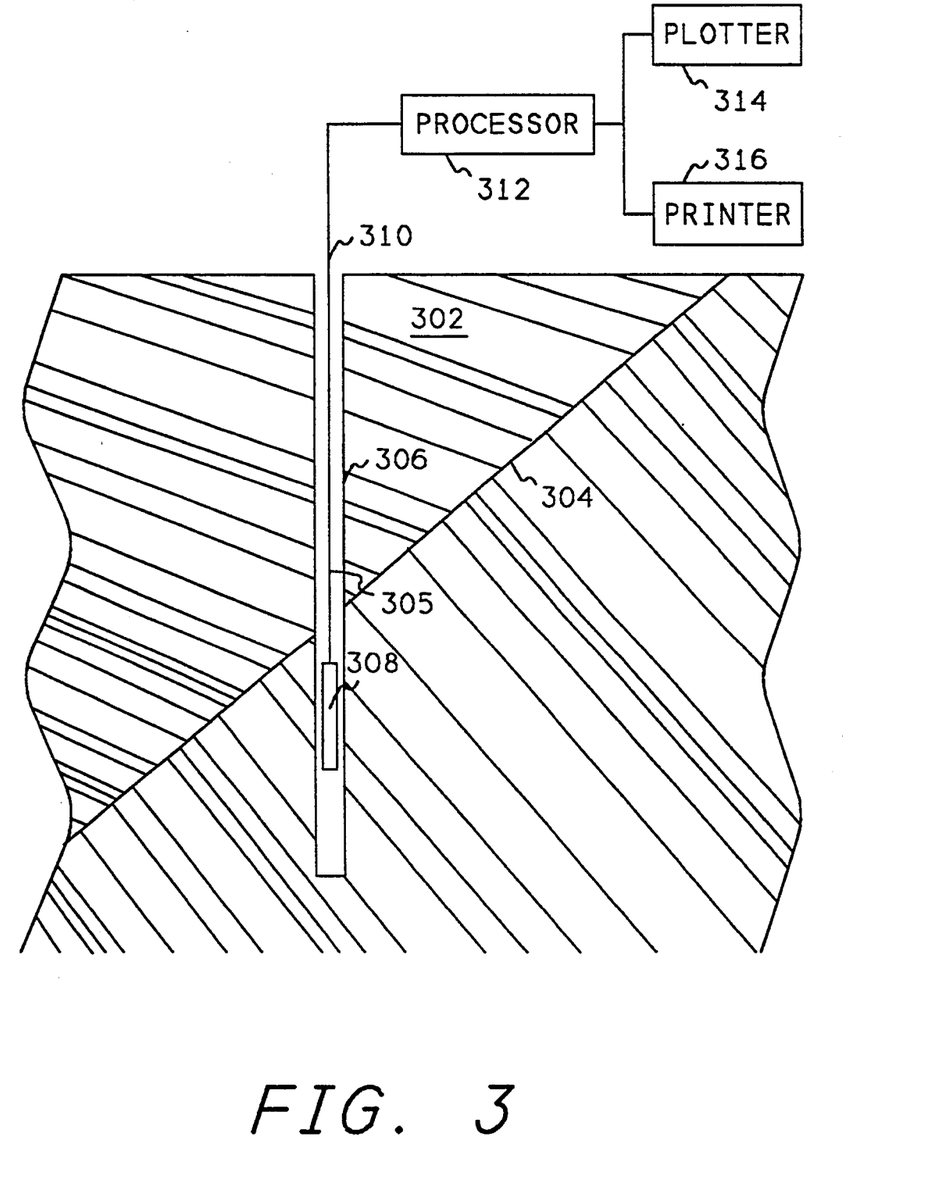
FIG. 3 is a schematic diagram illustrating the present invention obtaining and plotting data from a borehole drilled through a fault.

FIG. 3 shows a schematic diagram illustrating the present invention obtaining and plotting data from a borehole. Referring now to FIG. 3, a geologic formation 302 contains a fault 304 through which a borehole 305 has been drilled. Similar to the manner of FIG. 2, bedding planes below the fault 304 are at an angle different from the angle of bedding planes above the fault 304. A fault might also be indicated if the angle of the bedding planes stayed the same, but the dip direction of the bedding planes changed.

A measurement instrument 308, such as a dipmeter or a formation microscanner (FMS) described in the background of the invention, is moved through the borehole 305 to create a borehole imaging log that will indicate each of the bedding planes contained above and below the fault 304. The borehole imaging log can then be processed, either by computer methods or by manual methods, to create a table such as Table 1 which indicates sample number, depth, dip magnitude, and dip direction. The sample number simply indicates each place a bedding plane was detected, either manually or automatically. Sample numbers are generally indicated to be in the same order as depth. That is, the measurements would be sorted according to depth, and a sample number then incrementally applied to each sample.

Data from the measurement instrument 308 is conducted over a cable 310 to a processor 312 which contains borehole analysis software as well as the cumulative dip plot analysis software of the present invention. Once the measurements of Table 1 have been created, either by the borehole analysis software, or by manual analysis, the dip magnitudes of each successive sample can be added to the previous cumulative dip to create a cumulative dip for each sample, as shown in column 5 of Table 1. Once the cumulative dip of column 5 has been created, cumulative dip can be plotted against either depth or sample number, to create a graph similar to the one which will be described below with respect to FIG. 8.

Once the cumulative dip has been plotted, the plot can be manually analyzed to detect inflections which indicate faults or unconformities. One can visually examine the graph of FIG. 8 and see that two straight lines can be fitted to the data, and these lines intersect at approximately sample 120, thus indicating a fault or unconformity exists at the depth corresponding to sample 120.

This manual analysis can be done on the plot after it is created, or the analysis can be done on a graphics display of the data. If done on a graphics display, an operator can visually select the points to be grouped, and visually create a straight line that approximates the group of points.

In addition to manual analysis of the plotted data, computer analysis can also be performed by breaking the samples into arbitrary groups, and using line fitting techniques, such as the method of least squares, to fit lines to each of the arbitrary groups. Each of these lines can then be compared to each of the other lines to determine whether the lines are parallel, or whether they intersect at a location within the formation. If these lines intersect at a location within the formation, this location is a good candidate to contain a fault or unconformity.

Another method is to combine the manual and computer analysis of the data. First the data is plotted on a graphics display, then an operator selects a group of points. After the operator selects the group of points, the computer system creates a line representative of the group, using a method such as sum of least squares. The computer system then asks the operator to select another group. After the operator has selected all desired groups, the computer system compares the lines created in the manner described above.

Figure 4:
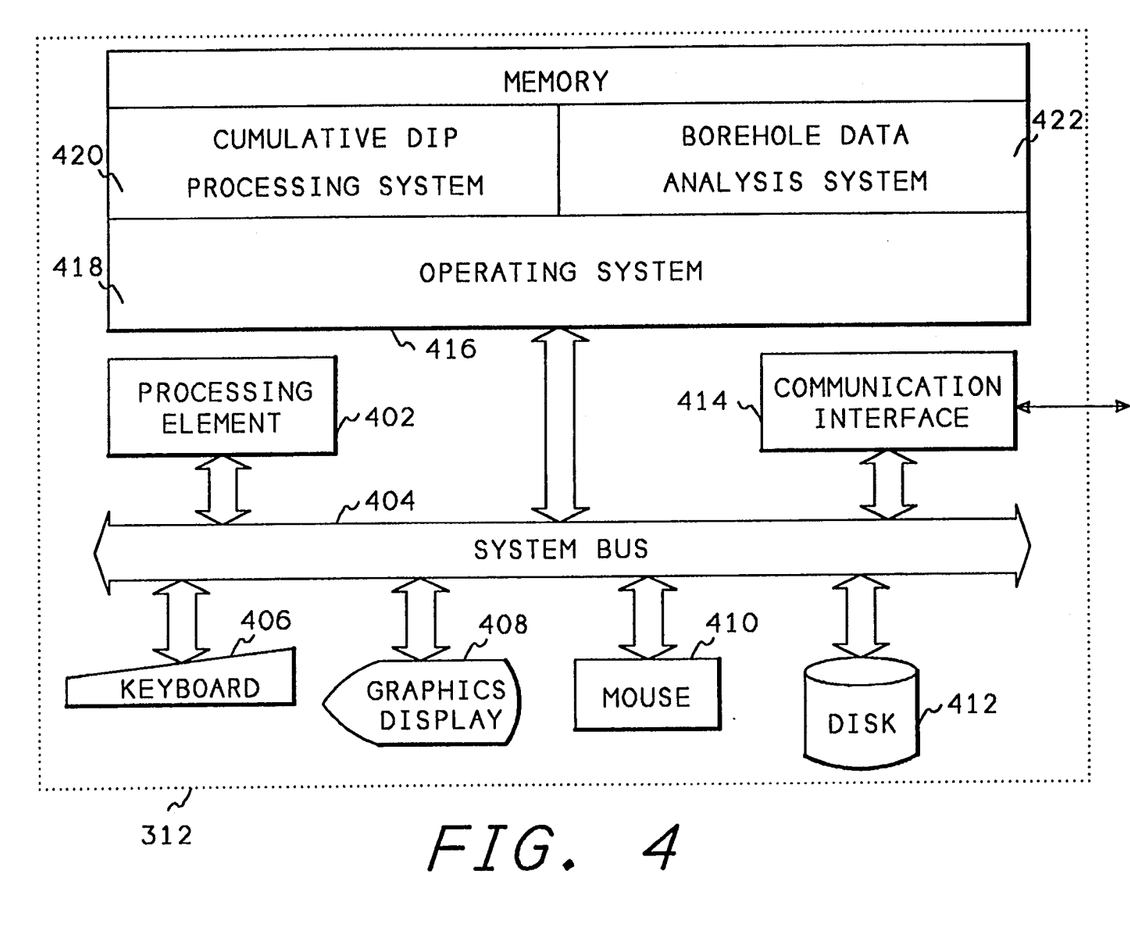
FIG. 4 shows a block diagram of a computer system used in the present invention.

FIG. 4 shows a block diagram of the processor 312 of FIG. 3. Referring now to FIG. 4, the processor 312 contains a processing element 402 which communicates to other elements of the computer system 312 over a system bus 404. A keyboard 406, and a mouse graphics input device 410, are used to input data into the computer system 312. A graphics display 408 is used by the computer system 312 to display information to the user of the system. A disk 412 is used to contain the software and data of the present invention. A communications interface 414 is used to communicate to the logging instrument, such as instrument 308 of FIG. 3, and to other devices such as the plotter 314 (FIG. 3) or the printer 316 (FIG. 3).

A memory 416 contains an operating system 418 which is used by the cumulative dip processing system 420 and borehole analysis system 422 of the present invention. Borehole data analysis system 422, analyzes the data from the measuring instrument 308 to produce the data of the first four columns of Table 1. Borehole data analysis system software 422, is software well known in the art, such as Schlumberger's image-examiner work station using FLIP/FRACVIEW Version 1.03, available from Schlumberger. This software can analyze data from Schlumberger's formation microscanner device, or Schlumberger's formation microimager device, to produce the data of the first four columns of Table 1.

Figure 5:
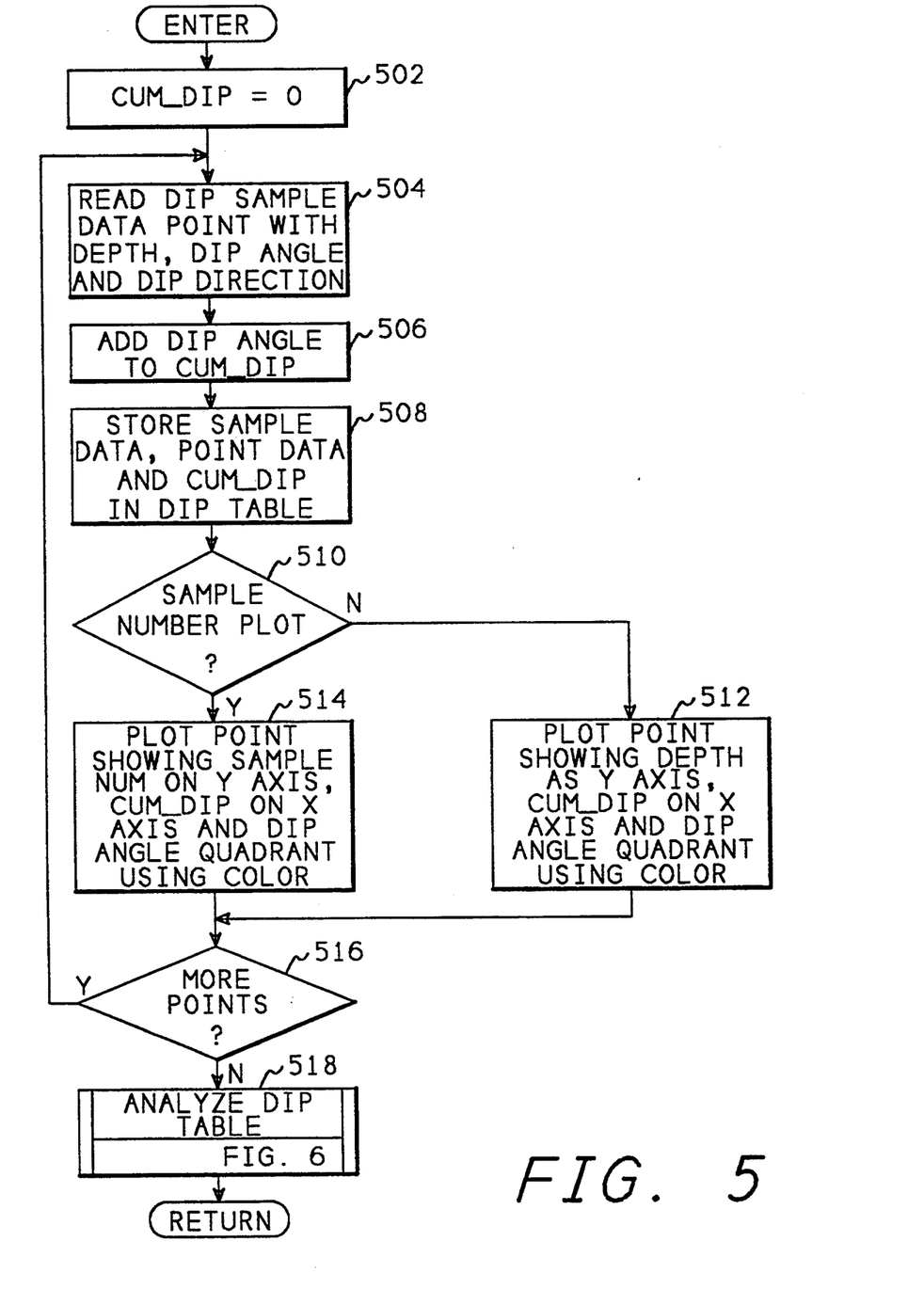
FIGS. 5 through 7 show a flowchart of the process of the invention.
Figure 6:
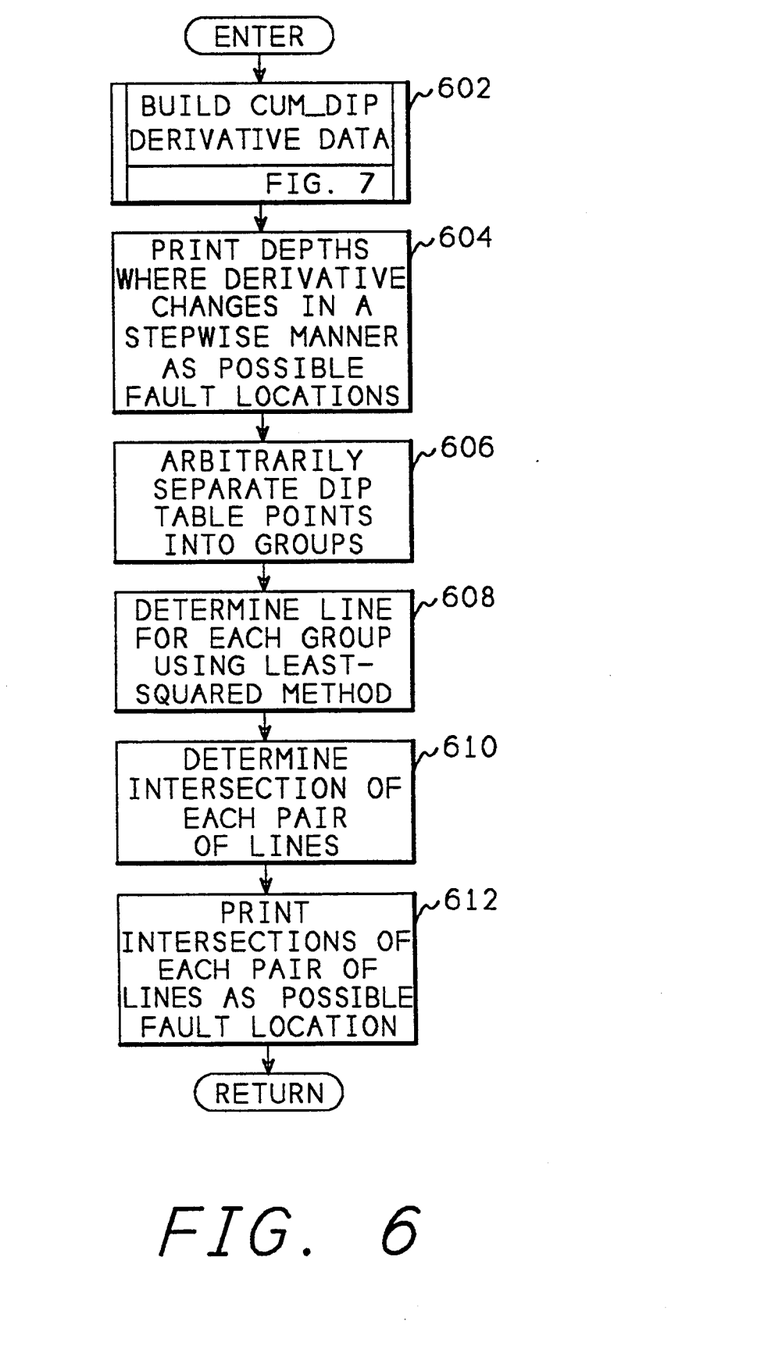
Figure 7:
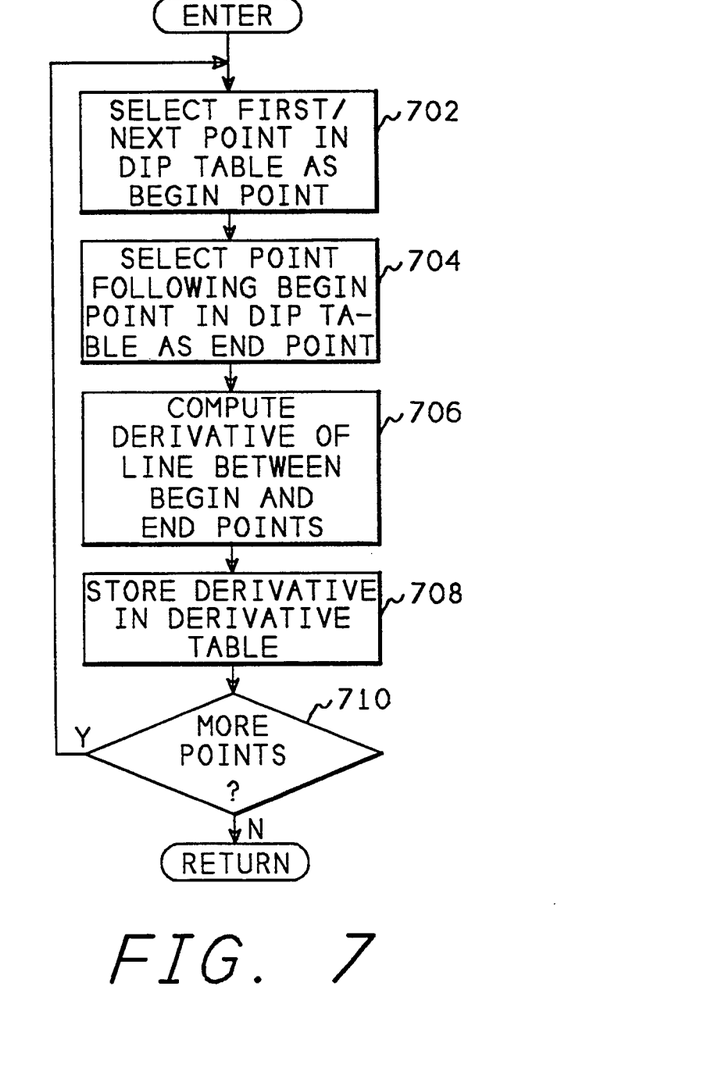

FIGS. 5-7 show a flowchart of the cumulative dip processing system 420 of FIG. 4. Referring now to FIGS. 5-7, when a user requests the cumulative dip processing system to plot data from a borehole image, control enters at block 502 of FIG. 5. Block 502 sets a variable CUM_DIP to zero. Block 504 then reads the first or next dip sample data point containing the depth, dip angle, and dip direction. Block 506 adds the dip angle of this sample to the variable CUM_DIP, and block 508 stores the sample data point including the CUM_DIP variable into a dip table, which has the same structure as described above with respect to Table 1.

Block 510 then determines whether sample number plot or a depth plot was requested by the user. If a sample number plot was requested, block 510 transfers to block 514 which plots the point read in block 504 with the sample number on the Y axis of the plot, the CUM_DIP variable on the X axis, and the dip angle quadrant is plotted using a color or a special symbol. That is, if the dip angle is in the quadrant from zero to 90°, the point plotted on the graph would either be a chosen color for the first quadrant, for example red, or a chosen symbol, for example a plus sign, for this quadrant. On the other hand, if the dip angle is between 90° and 180°, a different color or a different symbol would be plotted. Similarly, a different color or symbol would be plotted for dip angles of 180°-270°, and for angles between 270°-360° or 0°.

If the user had requested a depth plot, block 510 transfers to block 512 which plots the point showing depth on the Y axis, CUM_DIP on the X axis, and dip angle quadrant using color or a special symbol as described above.

After plotting the point, control goes to block 516 which determines whether there are more points to be plotted. If there are, block 516 transfers back to block 504 to read the next sample and plot this point.

After all points have been plotted, block 516 transfers to block 518 which calls FIG. 6 to analyze the dip table created in block 508. After returning from FIG. 6, FIG. 5 returns control to the operating system 418 (FIG. 4).

FIG. 6 shows a flowchart of the analyzed dip table called from block 518 of FIG. 5. Referring now to FIG. 6, after entry, block 602 calls FIG. 7 to build a derivative table from the CUM_DIP data stored in the dip table. After returning from FIG. 7, block 604 prints the depths from the dip table entries where the derivative for the entry undergoes a stepwise change in value, since at any point where the derivative has a stepwise change, a possible fault or unconformity exists. The amount of change recognized as a fault or unconformity could be set by a user after visually examining the plot of derivative data, or it could arbitrarily be set at some level between an average derivative value and a worst case derivative value.

After plotting the depths where the derivative has a stepwise change, block 604 transfers to block 606 which arbitrarily separates the dip table points into groups. Block 608 then fits a line to each group of points, using a line fitting method such as the method of least squares. Block 610 then compares each line created in block 608 to every other line created in block 608 to determine whether any of the pairs of lines intersects at a location within the formation. Block 612 then prints the depths where any intersections of these pairs occur within the formation, since these intersections indicate possible faults or unconformities.

The dip table points could be separated into groups by displaying the plot created by FIG. 5, and allowing an operator to visually indicate the groups. The computer system could then fit a line to each of the groups as described above.

Also, the operator could visually fit the straight line to the groups after identifying the groups.

FIG. 7 shows a flowchart of the routine to build the cumulative dip derivative table called from block 602 of FIG. 6. Referring now to FIG. 7, after entry, block 702 selects the first or next point in the dip table as a beginning point. Block 704 then selects the point following the beginning point as an end point. Block 706 then computes the derivative of the line between the begin and end points and block 708 stores this derivative in the derivative column of the dip table. Block 710 then determines if there are more points in the table and if there are, transfers back to block 702 to process the next point. After all points in the table have been processed, block 710 returns to FIG. 6.

Figure 8:
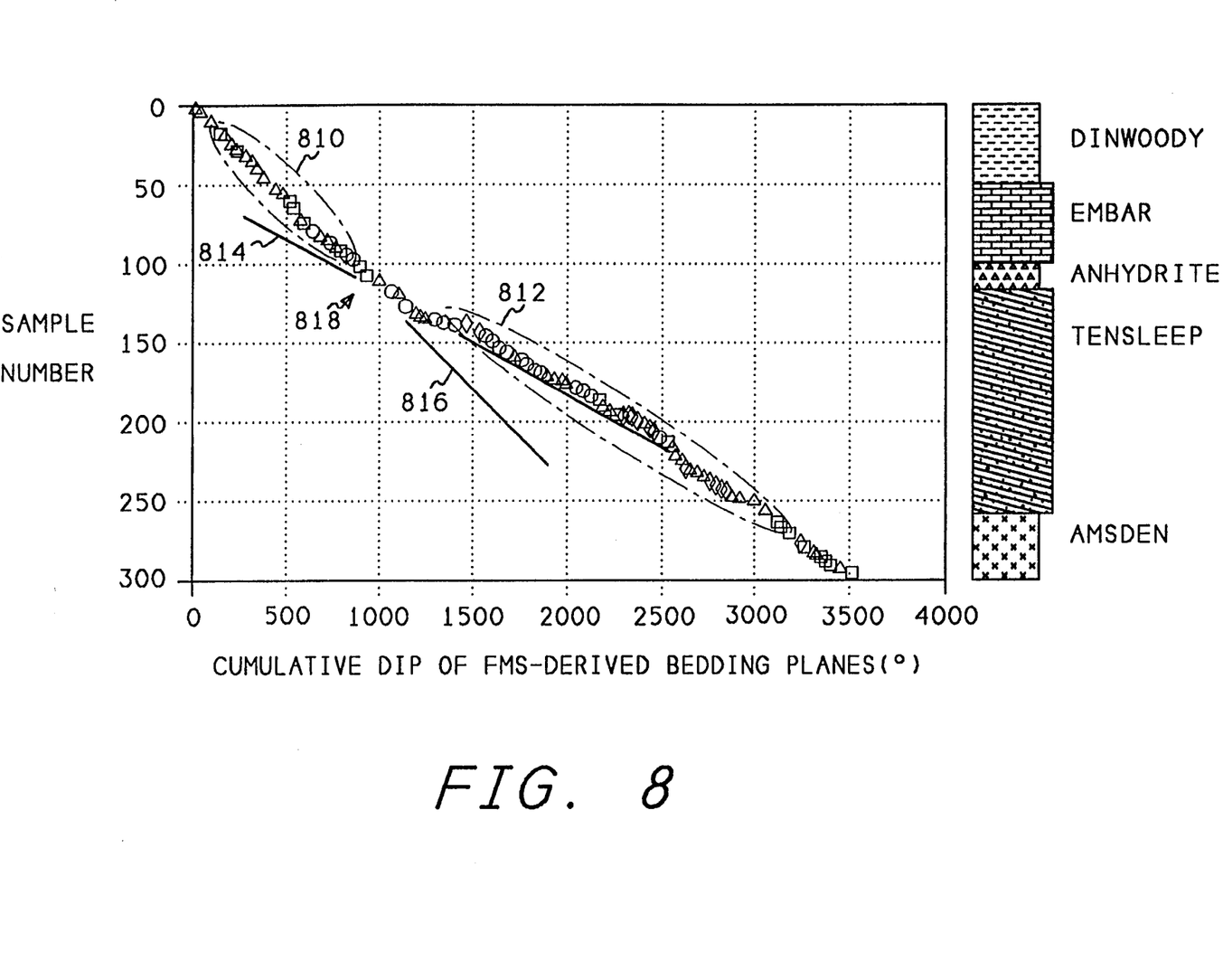
FIG. 8 shows a cumulative dip plot output by the present invention.

FIG. 8 shows a cumulative dip plot for bedding planes picked from the FMS log of a well in the Tensleep Sandstone and other formations in the Big Horn basin, Wyoming, U.S.A. The area surrounded by dotted line 810 was selected and a straight line 816 fitted to this area. A second area surrounded by dotted line 812 was selected and straight line 814 fitted to this second area. The straight lines 814 and 816 cross at the location pointed to by arrow 818, indicating a fault or unconformity at the depth where the location 818 occurs. This depth is at the top of the Tensleep Sandstone location, which corresponds to a well-known regional unconformity in this formation.

Figure 9:
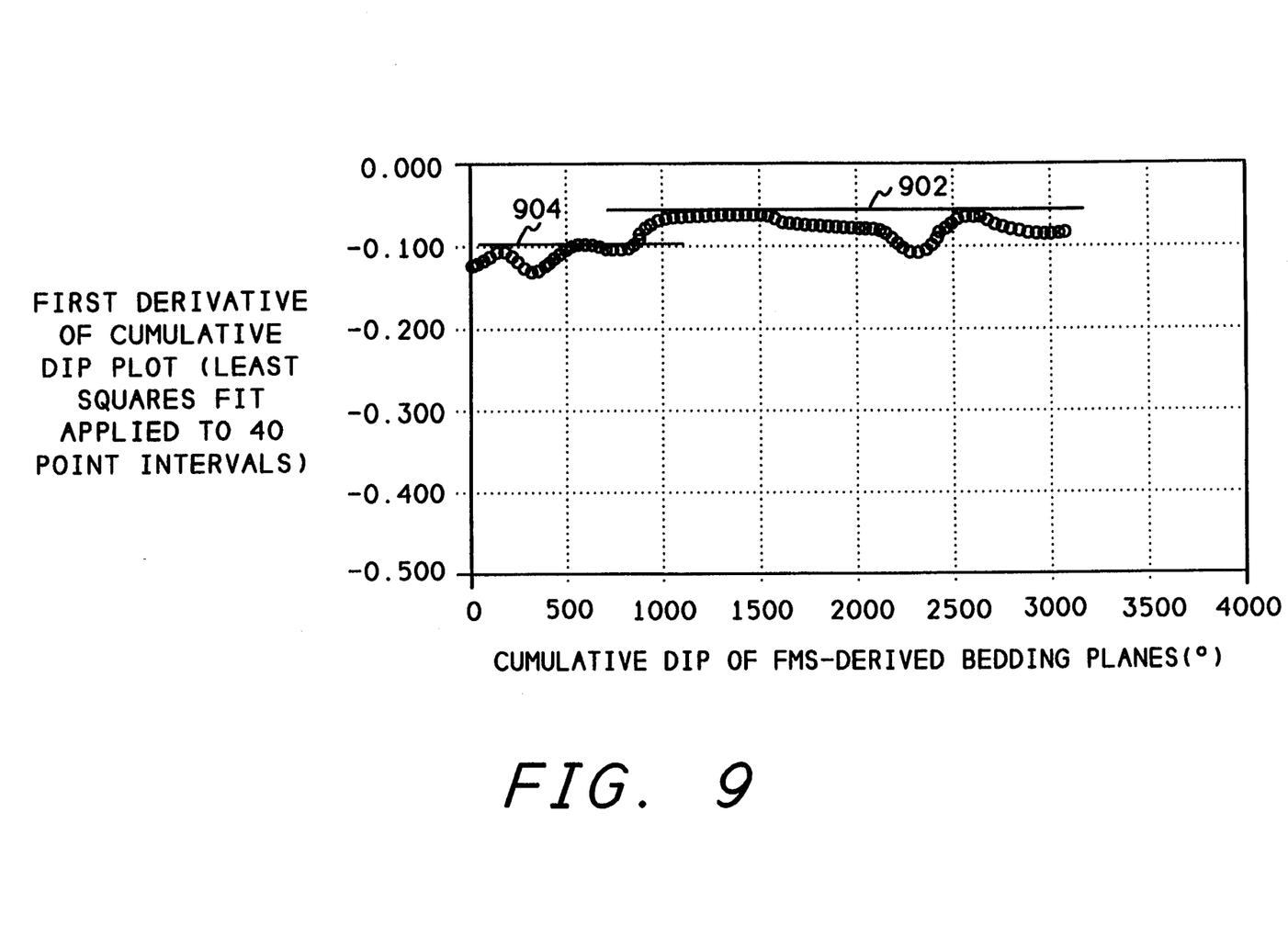
FIG. 9 shows a derivative of the data plotted in FIG. 8.

FIG. 9 shows a plot of the derivative of the data plotted in FIG. 8. This shows that the fault identified by the intersection of the straight lines in FIG. 8 also is clearly shown as a stepwise change using the derivative of the data. For example, fitting straight lines 902 and 904 to the data clearly shows a stepwise change at approximately 1000 degrees of cumulative dip, the same location as the intersection of lines 814 and 816 in FIG. 8.

Having thus described a presently preferred embodiment of the present invention, it will now be appreciated that the aspects of the invention have been fully achieved, and it will be understood by those skilled in the art that many changes in construction and circuitry and widely differing embodiments and applications of the invention will suggest themselves without departing from the spirit and scope of the present invention. The disclosures and the description herein are intended to be illustrative and are not in any sense limiting of the invention, more preferably defined in scope by the following claims.

TABLE 1

| Samp. No. | Depth | Dip Magnitude | Dip Direction | Cumulative Dip | First Dertv. |
|---|---|---|---|---|---|
| 1 | 4033.8 | 12.8 | 202 | 12.8 | −0.084 |
| 2 | 4036.45 | 11.9 | 229 | 24.7 | −0.070 |
| 3 | 4045.06 | 14.3 | 199 | 39.0 | −0.051 |
| 4 | 4047.45 | 19.5 | 188 | 58.5 | −0.043 |
| 5 | 4066.04 | 23.0 | 218 | 81.5 | −0.071 |
| 6 | 4069.95 | 14.1 | 204 | 95.6 | −0.085 |
| 7 | 4071.40 | 11.8 | 208 | 107.4 | −0.074 |
| 8 | 4084.96 | 13.6 | 212 | 121.0 | −0.083 |
| 9 | 4088.38 | 12.1 | 202 | 133.1 | −0.046 |
| 10 | 4089.65 | 21.7 | 197 | 154.8 | −0.060 |
| 11 | 4091.13 | 16.7 | 217 | 171.5 | −0.068 |
| 12 | 4096.10 | 14.7 | 204 | 186.2 | −0.081 |
| 13 | 4098.86 | 12.4 | 209 | 198.6 | −0.123 |
| 14 | 4108.61 | 8.1 | 232 | 206.7 | −0.054 |
| 15 | 4128.00 | 18.4 | 182 | 225.1 | −0.060 |
| 16 | 4145.01 | 16.8 | 214 | 241.9 | −0.054 |
| 17 | 4146.10 | 18.6 | 217 | 260.5 | −0.083 |
| 18 | 4151.55 | 12.0 | 191 | 272.5 | −0.103 |
| 19 | 4168.60 | 9.7 | 218 | 282.2 | −0.058 |
| 20 | 4172.89 | 17.3 | 207 | 299.5 | — |

What is claimed is:

1. A process for plotting a location of at least one fault or unconformity within a geologic formation containing a well, said process comprising the steps of:

(a) extending a measurement instrument into said well at a predetermined rate wherein said measurement instrument creates a borehole imaging log containing bedding plane data;

(b) retrieving said bedding plane data from said borehole imaging log;

(c) tabulating a measurement of depth and dip angle from each of a plurality of bedding planes defined within said bedding plane data, wherein said measurements of depth and dip angle are tabulated in a predetermined order;

(d) accumulating said dip angle for each successive measurement tabulated in said predetermined order and tabulating said accumulated dip angle;

(e) plotting a two-dimensional graph showing a single point for each of said measurements, wherein said depth of said measurement is plotted on a first axis and said accumulated dip angle of said measurement is plotted on a second axis of said two-dimensional graph;

(f) fitting a straight line to each of a plurality of groups of said plotted points; and (g) labeling a fault or unconformity location at each point on said plot wherein said straight lines intersect, to create said plotted locations of said faults or unconformities.

2. The method of claim 1 wherein said predetermined order is descending.

3. The method of claim 1 wherein step (c) further comprises the following step (c1), and wherein step (e) further comprises the following step (e1):

(c1) assigning a sample number to each measurement;

(e1) plotting said two-dimensional graph showing a single point for each of said measurements, wherein said sample number is plotted on said first axis and said accumulated dip angle is plotted on said second axis.

4. The method of claim 1 further comprising the steps of:

(h) calculating a derivative value for each of said measurements of step (c), and tabulating said derivative value;

(i) plotting a two-dimensional graph showing a single point for said derivative value and said accumulated dip angle for each of said measurements, wherein said derivative value is plotted on a first axis and said accumulated dip angle is plotted on a second axis of said two-dimensional graph;

(j) labeling a fault or unconformity location at each point on said plot wherein said derivative value undergoes a stepwise shift, to create plotted locations of said faults or unconformities.

5. The process of claim 1 wherein said measuring instrument comprises a dipmeter device.

6. The process of claim 1 wherein said measurement instrument comprises a formation microscanner device.

7. The process of claim 1 wherein step (c) further comprises the following step (c1), step (d) further comprises the following step (d1), step (e) further comprises the following step (e1), and step (g) further comprises the following step (g1):

(c1) tabulating a dip direction angle for each of said plurality of measurements;

(d1) separating said dip direction angle for each of said measurements tabulated in step (c1) into one of a plurality of angle areas;

(e1) plotting an angle area of each of said plurality of measurements; and (g1) labeling a fault or unconformity location at each point in said plot wherein said angle area is different from an angle area plotted for a previous point.

8. The method of claim 7 wherein each of said angle areas is plotted as a different symbol.

9. The method of claim 7 wherein each of said angle areas is plotted as a different color.

10. A computer implemented process for plotting a location of at least one fault or unconformity within a geologic formation containing a well, said computer implemented process comprising the steps of:

(a) extending a measurement instrument into said well at a predetermined rate wherein said measurement instrument creates a borehole imaging log containing bedding plane data;

(b) retrieving said bedding plane data from said borehole imaging log;

(c) tabulating a measurement of depth and dip angle from each of a plurality of bedding planes defined within said bedding plane data, wherein each of said measurements are tabulated in a predetermined order;

(d) accumulating said dip angle for each successive measurement tabulated in step and tabulating said accumulated dip angle;

(e) plotting a two-dimensional graph showing a single point for each of said measurements, wherein said depth is plotted on a first axis and said accumulated dip angle is plotted on a second axis of said two-dimensional graph;

(f) accepting input from an operator to fit a straight line to each of a plurality of groups of said plotted points selected by said operator; and (g) labeling a fault or unconformity location at each point on said plot wherein said straight lines intersect, to create said plotted locations of said faults or unconformities.

11. The method of claim 10 wherein said predetermined order is descending.

12. The method of claim 10 wherein step (c) further comprises the following step (c1), and wherein step (e) further comprises the following step (e1):

(c1) assigning a sample number to each measurement;

(e1) plotting said two-dimensional graph showing a single point for each of said measurements, wherein said sample number is plotted on said first axis and said accumulated dip angle is plotted on said second axis.

13. The method of claim 10 further comprising the steps of:

(h) calculating a derivative value for each of said measurements of step (c) and tabulating said derivative value;

(i) plotting a two-dimensional graph showing a single point for said derivative value and said accumulated dip angle for each of said plurality of bedding planes, wherein said derivative value is plotted on a first axis and said accumulated dip angle is plotted on a second axis of said two-dimensional graph;

(j) labeling a fault or unconformity location at each point on said plot wherein said derivative value undergoes a stepwise shift, to create plotted locations of said faults or unconformities.

14. The process of claim 10 wherein step (c) further comprises the following step (c1), step (d) further comprises the following step (d1), step (e) further comprises the following step (e1), and step (g) further comprises the following step (g1):

(c1) tabulating a dip direction angle for each of said plurality of measurements;

(d1) separating said dip direction for each of said measurements tabulated in step (c) into one of a plurality of angle areas;

(e1) plotting an angle area of each of said plurality of measurements; and (g1) labeling a fault or unconformity location at each point in said plot wherein said angle area is different from an angle area plotted for a previous point.

15. A computer implemented process for identifying a location of at least one fault or unconformity within a geologic formation containing a well, from bedding plane data extracted from said well, said computer implemented process comprising the steps of:

(a) extending a measurement instrument into said well at a predetermined rate wherein said measurement instrument creates a borehole imaging log containing bedding plane data;

(b) retrieving said bedding plane data from said borehole imaging log;

(c) tabulating a measurement of depth and dip angle from each of a plurality of bedding planes defined within said bedding plane data, wherein each of said measurements of depth and dip angle are tabulated in a predetermined order;

(d) accumulating said dip angle for each successive measurement tabulated in said predetermined order and tabulating said accumulated dip angle;

(e) arbitrarily selecting a plurality of groups of said measurements;

(f) fitting a straight line to each of said plurality of groups of measurements;

(g) comparing each of said straight lines to each other straight line created in step (f); and (h) identifying a fault or unconformity location at each point wherein two of said straight lines intersect.

16. The method of claim 15 wherein said predetermined order is descending.

17. The method of claim 15 wherein step (c) further comprises the following step (c1), and wherein step (e) further comprises the following step (e1):

(c1) assigning a sample number to each measurement;

(e1) plotting said two-dimensional graph showing a single point for each of said measurements, wherein said sample number is plotted on said first axis and said accumulated dip angle is plotted on said second axis.

18. The method of claim 15 further comprising the steps of:

(h) computing a derivative value for each of said measurements of step (c) and tabulating said derivative value;

(i) plotting a two-dimensional graph showing a single point for said derivative value and said accumulated dip angle measurement for each of said plurality of bedding planes, wherein said derivative value is plotted on a first axis and said accumulated dip angle measurement is plotted on a second axis of said two-dimensional graph;

(j) labeling a fault or unconformity location at each point on said plot wherein said derivative value undergoes a stepwise shift, to create plotted locations of said faults or unconformities.

19. The process of claim 15 wherein step (c) further comprises the following step (c1), step (d) further comprises the following step (d1), step (e) further comprises the following step (e1), and step (g) further comprises the following step (g1):

(c1) tabulating a dip direction angle for each of said plurality of bedding planes;

(d1) separating said dip direction for each of said measurements tabulated in step (c) into one of a plurality of angle areas;

(e1) plotting an angle area of each of said plurality of bedding planes; and (g1) labeling a fault or unconformity location at each point in said plot wherein said angle area changes from an angle area plotted for a previous point.

* * * * *